United States Patent [19]

Burkat

[11] Patent Number: 5,182,836
[45] Date of Patent: Feb. 2, 1993

[54] PRESSURE ACTIVATED SEAT BELT LOCKING MECHANISM

[75] Inventor: Alexander Burkat, Placentia, Calif.

[73] Assignee: The Walt Disney Company, Burbank, Calif.

[21] Appl. No.: 753,410

[22] Filed: Aug. 30, 1991

[51] Int. Cl.⁵ ............................................ A44B 11/25
[52] U.S. Cl. ...................................... 24/633; 24/603; 24/640
[58] Field of Search ........................ 280/801; 297/468; 24/665, 603, 633, 650, 639, 640

[56] References Cited

U.S. PATENT DOCUMENTS

| | | | |
|---|---|---|---|
| 3,194,582 | 7/1965 | Kutz | 180/268 |
| 3,744,102 | 7/1973 | Gaylord | 24/603 |
| 3,766,611 | 10/1973 | Gaylord | 24/603 |
| 3,963,090 | 6/1976 | Hollins | 24/603 |
| 4,144,423 | 3/1979 | Föhl | 280/801 |
| 4,385,425 | 5/1983 | Tanaka et al. | 24/633 |
| 4,413,384 | 11/1983 | Lassche | 24/603 |
| 4,428,103 | 1/1984 | Wier | 24/654 |
| 4,553,625 | 11/1985 | Tsuge et al. | 180/268 |
| 4,575,908 | 3/1986 | Gloomis et al. | 24/633 |

OTHER PUBLICATIONS

Electrolux Autoliv miscellaneous drawings and specifications for Volvo seat belt mechanism (various dates, including 1983, 1987 and 1988). (6 pages).

Primary Examiner—Charles A. Marmor
Assistant Examiner—Paul Dickson
Attorney, Agent, or Firm—Pretty, Schroeder, Brueggemann & Clark

[57] ABSTRACT

A pressure activated seat belt locking device is disclosed for allowing an operator from a remote location to control the locking or unlocking of seat belts such as those used on amusement park type rides, or elsewhere. The seat belt locking device has a buckle portion into which a latching tongue is inserted and held into place by a retractable element which extends through an aperture in the latching tongue. The latching tongue can be removed from the buckle by depressing a release latch to disengage the retractable element from the aperture. The seat belt locking device is provided with a pneumatically inflatable air bladder which is exerted against a pivotable lever lock when properly inflated. The inflation of the air bladder causes the lever lock to pivot and bear against the lower end of the release latch, such that the release latch cannot be depressed by the user of the seat belt to disengage the retractable element from the latching tongue. Accordingly, the seat belt is retained in the locked position until the air bladder is deflated such that the lever lock pivots away from the release latch.

6 Claims, 2 Drawing Sheets

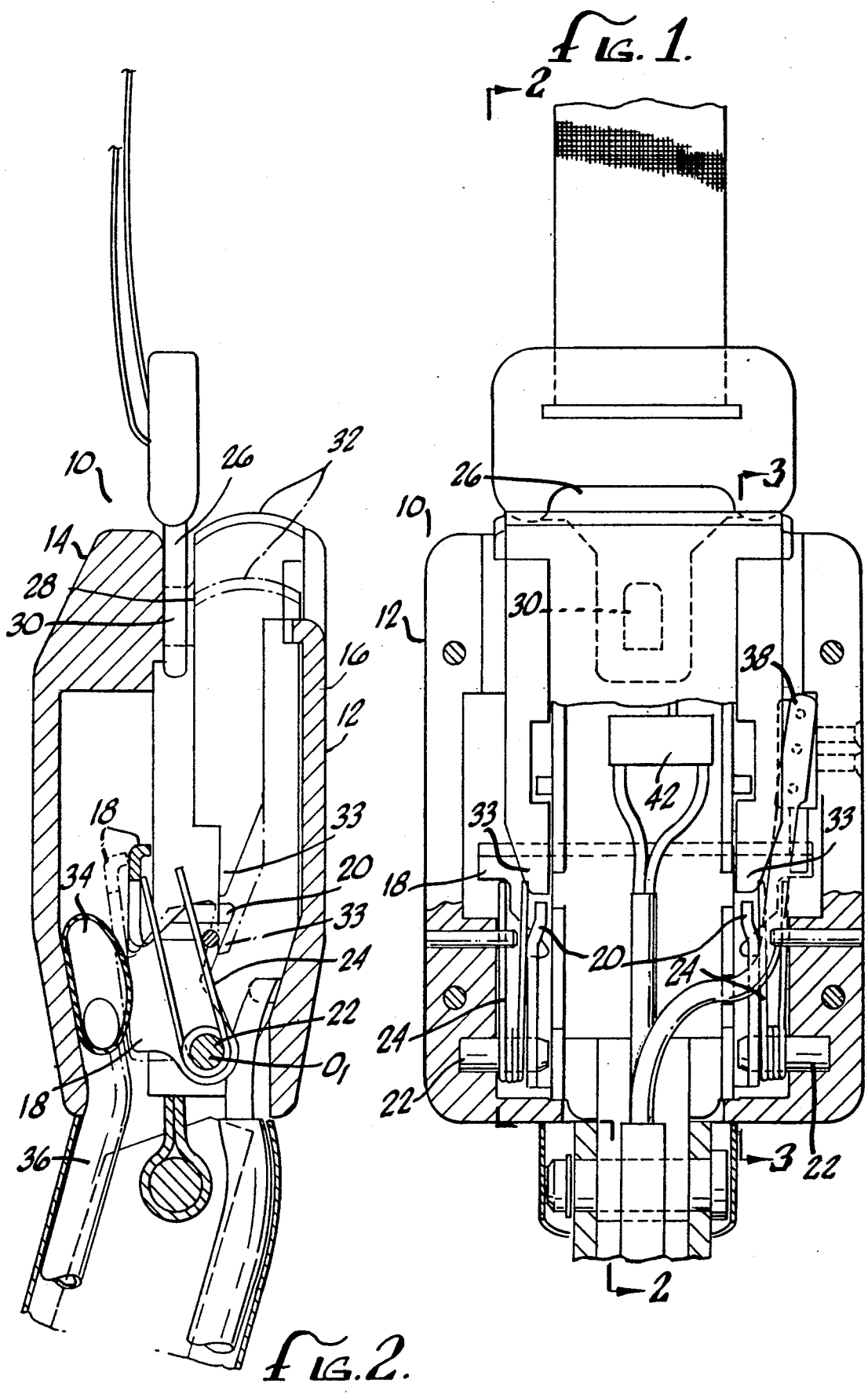

PRESSURE ACTIVATED SEAT BELT LOCKING MECHANISM

BACKGROUND OF THE INVENTION

The present invention relates to a seat belt locking mechanism and, more particularly, to a seat belt locking mechanism having a pneumatically inflatable air bladder for activating the locking or unlocking of a seat belt.

It is often desirable, such as on amusement park type rides, to provide passengers with seat belts which can be locked, or unlocked, simultaneously by a remote operator to ensure that the seat belts are securely fastened. Pressure activated seat belt mechanisms which have been used in the past have generally relied on a piston-cylinder type arrangement. For instance, U.S. Pat. No. 3,963,090 Hollins shows an automatic seat belt buckle unlatching mechanism which has a cylinder-piston arrangement in communication with an engine intake manifold. When the engine is started, a vacuum is created in the cylinder by the engine intake manifold, which in turn causes a cam shaft extending from the cylinder to draw inwardly and disengage from the latching mechanism. Accordingly, a spring will then urge the latching mechanism upwardly to lock the seat belt. Likewise, when the engine is turned off or stalled, the absence of a vacuum in the cylinder will cause the cam shaft to be urged against the latching mechanism to release or unlock the seat belt. Although the device is suitable for combustion type engines, it does not appear suitable for vehicles or amusement park rides which may operate by electricity, or which do not necessarily require that an engine be turned off. Further, the device as shown in the Hollins patent uses a complicated piston-cylinder type mechanism. Other seat belt mechanisms generally known have used an electrical solenoid as an actuator to lock or unlock the seat belt. However, these seat belt locking mechanisms require elaborate adjustment procedures every time a seat belt unit is removed and replaced, which is fairly often in frequently used seat belts such as those on amusement park rides. Further, another disadvantage of this design is that the components are custom made and have a relatively short life span.

Accordingly, there has existed a definite need for an automatic seat belt locking mechanism for overcoming these problems. Further, there is a need for a seat belt locking mechanism which can be activated by a remote operator, or by one other than the user of the seat belt if necessary, and which is easy to manufacture, has few custom-made parts, is durable, and which does not require any adjustments or extensive maintenance. The present invention satisfies these needs and provides further related advantages.

SUMMARY OF THE INVENTION

The present invention provides a seat belt locking device with a pneumatically inflatable air bladder for activating the locking mechanism. The seat belt locking mechanism is contained in a buckle having upper and lower housing portions. A latching tongue is capable of being inserted into the buckle portion between the upper and lower housing portions. The latching tongue is retained within the buckle portion by a retractable element which extends through an aperture in the latching tongue when the latching tongue is fully inserted into the buckle portion. The retractable element can be disengaged from the aperture in order to remove the latching tongue from the buckle portion by depressing a release latch.

In accordance with the present invention, a lever lock is provided in the buckle portion. The lever lock has two axially aligned pivot shafts on opposite sides such that the lever lock is pivotable about the shafts. Alternatively, the lever lock can have one shaft extending through its opposite sides. The lever lock is normally urged in the downward position by torsional springs which bear against its upper surface. An inflatable air bladder is positioned between the lower housing and the lever lock. The air bladder is connected to a pneumatic pressure source such that it can be inflated upon activation of the pressure source. Upon inflation, the air bladder overcomes the downward force of the torsional springs and pivots the lever lock about the shafts until the lever lock bears against the lower end of the release latch. In this position, the lever lock prevents the release latch from being depressed. Accordingly, the retractable element can not be disengaged from the aperture in order to release the latching tongue from the buckle portion. Consequently, the seat belt is in a fully locked position and cannot be removed by the occupant unless the air bladder is deflated.

Upon deflation of the air bladder, the torsional springs force the lever lock to pivot away from the lower end of the release latch. Accordingly, the release latch can be depressed to disengage the retractable element from the latching tongue in order to completely unfasten the seat belt.

In another aspect of the invention, the seat belt locking mechanism is provided with a lever lock switch to indicate whether the air bladder has been properly inflated and whether the lever lock is in the correct position. An additional contact switch can be provided to indicate whether the latching tongue has been fully inserted into the buckle portion.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. is a cross-sectional, top elevational view of the seat belt locking mechanism showing the buckle portion, and the latching tongue inserted into the buckle portion.

FIG. 2 is a cross-sectional, side elevational view of the seat belt locking mechanism showing the inflatable air bladder.

DETAILED DESCRIPTION OF THE PREFERRED EMBODIMENT

Figure 3:
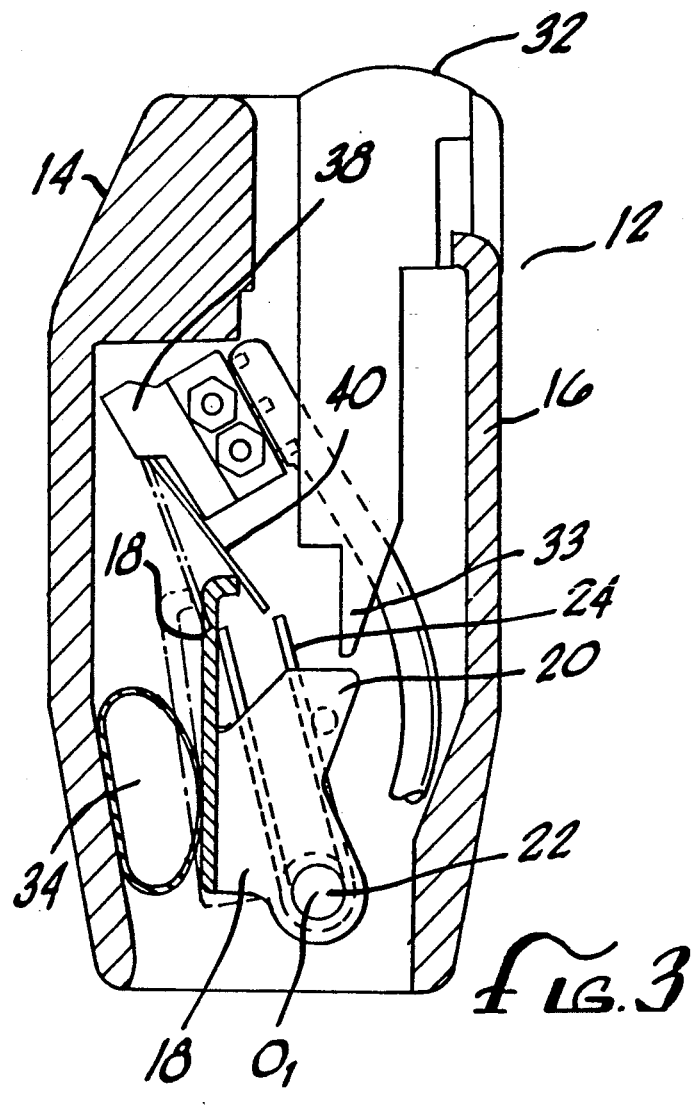
FIG. 3 is a cross-sectional view of the buckle portion illustrating the inflatable air bladder locking mechanism.

As shown in the exemplary drawings, the present invention is embodied in a seat belt locking mechanism, generally referred to by the reference numeral 10. With reference to FIG. 2 in particular, the seat belt locking mechanism 10 is contained in a buckle portion 12 having lower 14 and upper 16 housings.

As shown more readily in FIGS. 2 and 3, a lever lock 18 is positioned between the lower 14 and upper 16 housings. FIGS. 2 and 3 show the lever lock 18 in the upper and lower positions, as described in more detail below. The lever lock 18 has two flanges 20 extending from its opposite sides. The lever lock 18 has two axially aligned pivot shafts 22 on its opposite sides, as shown in the drawings. Alternatively, the lever lock 18 can be provided with one pivot shaft which extends through the opposite sides of the lever lock. In both configurations, the lever lock 18 pivots around center $O_1$, as shown in FIGS. 2 and 3. At least one torsional spring 24 bears against the upper surface of the lever lock 18 to generally urge the lever lock in a downward direction, towards the lower housing 14. The torsional springs 24 are secured at one of their ends to the pivot shafts 22.

As shown in FIGS. 1 and 2, a belt or latching tongue 26 is inserted into the buckle portion 12 between lower 14 and upper 16 housings. As the latching tongue 26 is inserted into the buckle portion 14, it depresses a retractable element 28 until the retractable element is aligned with an aperture 30 in the latching tongue 26. Once aligned, the retractable element 28 extends into the aperture 30 and the latching tongue 26 is retained within the seat belt. However, the latching tongue 26 can be released by simply depressing a release latch 32 which causes the retractable element 28 to disengage from the aperture 30. FIG. 2 shows the release latch 32 in its normal and depressed positions.

In further accordance with the present invention, an inflatable air bladder 34 is positioned between the lever lock 18 and lower housing 14. The air bladder 34 communicates with a pneumatic pressure device (not shown) by a pressure line 36. However, it should be appreciated that the air bladder 34 could be inflated by other means or other pressure devices such as a hydraulic generator.

The inflation of the air bladder 34 by pressurization from the pneumatic pressure source causes the air bladder to bear against the lever lock 18. Upon proper inflation, the air bladder 34 exerts a force on the lever lock 18 sufficient to overcome the torque of the torsional springs 24. The lever lock 18 (along with the flanges 20) will thereby rotate about the pivot shafts 22 causing it to move towards the upper housing 16.

With the lever lock 18 and flanges 20 in the upward position due to the inflation of the air bladder 34, the lower ends 33 of the release latch 32 bear against the flanges 20 of the lever lock (or are positioned a slight distance from the flanges). Accordingly, in this position, the release latch 32 is prevented from being depressed by the user of the seat belt in order to release the retractable element 28 from the aperture 30 so that the latching tongue 26 can be removed from the buckle portion 12. Alternatively, the release latch 32 may contain an opening through which the lever lock 18 is inserted upon inflation of the air bladder 34. Consequently, in this embodiment, the lever lock 18 will also prevent the release latch 32 from being depressed to remove the latching tongue 26 from the buckle portion 12 as described above.

Likewise, upon deflation of the air bladder 34 by release of the air pressure from the pneumatic source, the torque of the torsional springs 24 will overcome any residual force exerted by the air bladder, thereby causing the lever lock 18 and flanges 20 to pivot away from the lower ends of the release latch 32. In this position, the release latch 32 can be depressed to disengage the retractable element 28 from the aperture 30 so that the latching tongue 26 can be removed from the buckle portion 12.

It should be appreciated that the inflation or deflation of the air bladder 34 to respectively lock or unlock the seat belt can be activated by an operator from a location remote from the seat belt. For instance, in the situation where the seat belt mechanism is used on an amusement park ride, the operator of the ride can activate the inflation of the air bladder 34 once the occupant of the ride is seated and has inserted the latching tongue 26 into the buckle portion 12. Likewise, once the ride has terminated, the operator can activate the deflation of the air bladder 34 to allow the release latch 32 to be depressed by the occupants so that they can unfasten the seat belts and exit the ride. Thus, the seat belt mechanism of the present invention has the further advantage of allowing the operator of the ride to control the locking or unlocking of the seat belts, in order to avoid the accidental or unintentional releasing of the seat belts by the occupants of the ride.

The present invention also contemplates a lever lock switch 38 to indicate whether the air bladder 34 is properly inflated and whether the lever lock 18 is in the correct position once the air bladder is inflated. To accomplish this, a switch 38 is provided as shown in FIG. 3 with a bar 40 extending from the switch. As the air bladder 34 is inflated, the lever lock 18 is exerted against the bar 40 causing it to activate the switch 38 which in turn sends an electrical signal to indicate that the air bladder 34 is inflated and that the lever lock 18 is in the appropriate position.

Another contact switch 42 can be provided to indicate whether the latching tongue 26 has in fact been inserted into the buckle portion 12. The switch 42 is activated when the latching tongue 26 makes contact with the switch as it is fully inserted into the buckle portion 12 and engages the retractable element 28. It should be understood that this type of switch is commonly used on automobile seat belts to signal whether the occupant has inserted the latching tongue 26 into the buckle portion 12 to fasten the seat belt. Since the signal from the lever lock switch 38 only indicates that the air bladder 34 has been properly inflated and that the lever lock 18 is in the correct position, this type of switch can be used with the present invention to indicate that the latching tongue is in fact inserted into the buckle.

While a particular form of the invention has been illustrated and described, it will be appreciated that various modifications can be made without departing from the spirit and scope of the invention. Therefore, it is not intended that the invention be limited, except as by the appended claims.

We claim:

1. A seat belt locking mechanism comprising:
   a seat belt buckle;
   a latching tongue capable of being inserted into the buckle;
   a retractable element which extends through an aperture in the latching tongue when the latching tongue is fully inserted into the buckle;
   a release latch which can be depressed to disengage the retractable element from the aperture in order to release the latching tongue from the buckle;
   a lever lock contained within the buckle and which is pivotable about a shaft;
   a spring which bears against the lever lock to normally urge it in a downward position;

an air bladder positioned underneath the lever lock, said air bladder connected to a pressure source such that it can be inflated upon pressurization from the pressure source; and whereby upon inflation, the air bladder urges the lever lock upwardly, overcoming the downward force of the spring, such that the lever lock either bears against or is positioned a slight distance from the release latch thereby preventing it from being depressed in order to disengage the retractable element from the aperture so that the latching tongue could be removed from the buckle to unlock the seat belt.

2. The seat belt locking mechanism of claim 1, wherein the lever lock has two flanges extending therefrom which either bear against or are positioned a slight distance from the release latch to prevent it from being depressed to remove the latching tongue when the air bladder is inflated.

3. The seat belt locking mechanism of claim 1, wherein the lever lock has two axially aligned pivot shafts about which it pivots.

4. The seat belt locking mechanism of claim 1, further comprising:
a lever lock switch whereby the lever lock bears against the switch as the air bladder is inflated, causing the switch to provide a signal indicating whether the air bladder is properly inflated and whether the lever lock is in the correct position.

5. The seat belt lock mechanism of claim 4, further comprising:
a contact switch to indicate whether the latching tongue is properly inserted into the buckle portion.

6. The seat belt locking mechanism of claim 1, wherein the pressure source is a pneumatic pressure source.

* * * * *